United States Patent [19]
Sharma et al.

[11] Patent Number: 6,055,605
[45] Date of Patent: Apr. 25, 2000

[54] TECHNIQUE FOR REDUCING LATENCY OF INTER-REFERENCE ORDERING USING COMMIT SIGNALS IN A MULTIPROCESSOR SYSTEM HAVING SHARED CACHES

[75] Inventors: Madhumitra Sharma, Shrewsbury, Mass.; Simon C. Steely, Jr., Hudson, N.H.; Kourosh Gharachorloo, Stanford, Calif.; Stephen R. Van Doren, Northborough, Mass.

[73] Assignee: Compaq Computer Corporation, Houston, Tex.

[21] Appl. No.: 08/957,544

[22] Filed: Oct. 24, 1997

[51] Int. Cl.⁷ .............................. G06F 13/00; G06F 12/00
[52] U.S. Cl. .................. 711/130; 711/147; 711/151; 711/152; 712/10
[58] Field of Search .................... 711/130, 147, 711/150, 151, 152, 167; 712/10, 14, 16

[56] References Cited

U.S. PATENT DOCUMENTS

| | | | |
|---|---|---|---|
| 5,182,808 | 1/1993 | Bagnoli et al. | 710/119 |
| 5,193,167 | 3/1993 | Sites et al. | 711/163 |
| 5,197,148 | 3/1993 | Blount et al. | 714/5 |
| 5,313,591 | 5/1994 | Averill | 710/119 |
| 5,390,316 | 2/1995 | Cramer et al. | 709/201 |
| 5,504,900 | 4/1996 | Raz | 707/10 |
| 5,546,582 | 8/1996 | Brockmeyer et al. | 709/300 |
| 5,551,005 | 8/1996 | Sarangdhar et al. | 711/145 |
| 5,555,382 | 9/1996 | Thaller et al. | 710/113 |
| 5,761,731 | 6/1998 | Van Doren et al. | 711/155 |
| 5,787,480 | 7/1998 | Scales et al. | 711/148 |
| 5,829,051 | 10/1998 | Steely, Jr. et al. | 711/216 |
| 5,841,973 | 11/1998 | Kessler et al. | 709/250 |

OTHER PUBLICATIONS

Shared Memory Consistency Models: A Tutorial, Sarita V. Adve, et al., Western Research Laboratory, 1995, pp. 1–28.

*Primary Examiner*—Eddie P. Chan
*Assistant Examiner*—Hong Kim
*Attorney, Agent, or Firm*—Cesari and McKenna

[57] ABSTRACT

A technique reduces the latency of inter-reference ordering between sets of memory reference operations in a multiprocessor system having a shared memory that is distributed among a plurality of processors that share a cache. According to the technique, each processor sharing a cache inherits a commit-signal that is generated by control logic of the multiprocessor system in response to a memory reference operation issued by another processor sharing that cache. The commit-signal facilitates serialization among the processors and shared memory entities of the multiprocessor system by indicating the apparent completion of the memory reference operation to those entities of the system.

17 Claims, 11 Drawing Sheets

| ADDRESS 1012 | STATUS BIT 1020 | |
| --- | --- | --- |
| | OTHER STATUS BITS | VALID 1022 |
| ENTER | Y |
| ENTER | Y |
| ENTER | Y |
| ENTER | Y |

*FIG. 10*

TECHNIQUE FOR REDUCING LATENCY OF INTER-REFERENCE ORDERING USING COMMIT SIGNALS IN A MULTIPROCESSOR SYSTEM HAVING SHARED CACHES

CROSS-REFERENCE TO RELATED APPLICATION

This invention is related to the U.S. patent application Ser. No. 08/957,097 titled, *Method and Apparatus for Reducing Latency of Inter-Reference Ordering in a Multiprocessor System* by Sharma et al., which was filed on even date herewith and assigned to the assignee of the present invention, and which application is hereby incorporated by reference as though fully set forth herein.

FIELD OF THE INVENTION

The invention relates to multiprocessor systems and, more particularly, to the efficient ordering of memory reference operations issued by a processor of a multiprocessor system having a shared cache.

BACKGROUND OF THE INVENTION

Multiprocessing systems, such as symmetric multi-processors, provide a computer environment wherein software applications may operate on a plurality of processors using a single address space or shared memory abstraction. In a shared memory system, each processor can access any data item without a programmer having to worry about where the data is or how to obtain its value; this frees the programmer to focus on program development, e.g., algorithms, rather than managing partitioned data sets and communicating values. Interprocessor synchronization is typically accomplished in a shared memory system between processors performing read and write operations to "synchronization variables" either before and after accesses to "data variables".

For instance, consider the case of a processor P1 updating a data structure and processor P2 reading the updated structure after synchronization. Typically, this is accomplished by P1 updating data values and subsequently setting a semaphore or flag variable to indicate to P2 that the data values have been updated. P2 checks the value of the flag variable and, if set, subsequently issues read operations (requests) to retrieve the new data values. Note the significance of the term "subsequently" used above; if P1 sets the flag before it completes the data updates or if P2 retrieves the data before it checks the value of the flag, synchronization is not achieved. The key is that each processor must individually impose an order on its memory references for such synchronization techniques to work. The order described above is referred to as a processor's inter-reference order. Commonly used synchronization techniques require that each processor be capable of imposing an inter-reference order on its issued memory reference operations.

| P1 | | P2 | | |
|---|---|---|---|---|
| Store | Data, New-value | L1: | Load | Flag |
| Store | Flag, 0 | | BNZ | L1 |
| | | | Load | Data |

The inter-reference order imposed by a processor is defined by its memory reference ordering model or, more commonly, its consistency model. The consistency model for a processor architecture specifies, in part, a means by which the inter-reference order is specified. Typically, the means is realized by inserting a special memory reference ordering instruction, such as a Memory Barrier (MB) or "fence", between sets of memory reference instructions. Alternatively, the means may be implicit in other opcodes, such as in "test-and-set". In addition, the model specifies the precise semantics (meaning) of the means. Two commonly used consistency models include sequential consistency and weak-ordering, although those skilled in the art will recognize that there are other models that may be employed, such as release consistency.

Sequential Consistency

In a sequentially consistent system, the order in which memory reference operations appear in an execution path of the program (herein referred to as the "I-stream order") is the inter-reference order. Additional instructions are not required to denote the order simply because each load or store instruction is considered ordered before its succeeding operation in the I-stream order.

Consider the program example below. The program performs as expected on a sequentially consistent system because the system imposes the necessary inter-reference order. That is, P1's first store instruction is ordered before P1's store-to-flag instruction. Similarly, P2's load flag instruction is ordered before P2's load data instruction. Thus, if the system imposes the correct inter-reference ordering and P2 retrieves the value 0 for the flag, P2 will also retrieve the new value for data.

Weak Ordering

In a weakly-ordered system, an order is imposed between selected sets of memory reference operations, while other operations are considered unordered. One or more MB instructions are used to indicate the required order. In the case of an MB instruction defined by the Alpha® 21264 processor instruction set, the MB denotes that all memory reference instructions above the MB (i.e., pre-MB instructions) are ordered before all reference instructions after the MB (i.e., post-MB instructions). However, no order is required between reference instructions that are not separated by an MB.

| P1: | | P2: | | |
|---|---|---|---|---|
| Store | Data1, New-value1 | L1: | Load | Flag |
| Store | Data2, New-value2 | | BNZ | L1 |
| MB | | | MB | |
| Store | Flag, 0 | | Load | Data1 |
| | | | Load | Data2 |

In above example, the MB instruction implies that each of P1's two pre-MB store instructions are ordered before P1's store-to-flag instruction. However, there is no logical order required between the two pre-MB store instructions. Similarly, P2's two post-MB load instructions are ordered after the Load flag; however, there is no order required between the two post-MB loads. It can thus be appreciated that weak ordering reduces the constraints on logical ordering of memory references, thereby allowing a processor to gain higher performance by potentially executing the unordered sets concurrently.

The prior art includes other types of barriers as described in literature and as implemented on commercial processors. For example, a write-MB (WMB) instruction on an Alpha microprocessor requires only that pre-WMB store instructions be logically ordered before any post-WMB stores. In other words, the WMB instruction places no constraints at all on load instructions occurring before or after the WMB.

In order to increase performance, modern processors do not execute memory reference instructions one at a time. It is desirable that a processor keep a large number of memory references outstanding and issue, as well as complete, memory reference operations out-of-order. This is accomplished by viewing the consistency model as a "logical order", i.e., the order in which memory reference operations appear to happen, rather than the order in which those references are issued or completed. More precisely, a consistency model defines only a logical order on memory references; it allows for a variety of optimizations in implementation. It is thus desired to increase performance by reducing latency and allowing (on average) a large number of outstanding references, while preserving the logical order implied by the consistency model.

In prior systems, a memory barrier instruction is typically contingent upon "completion" of an operation. For example, when a source processor issues a read operation, the operation is considered complete when data is received at the source processor. When executing a store instruction, the source processor issues a memory reference operation to acquire exclusive ownership of the data; in response to the issued operation, system control logic generates "probes" to invalidate old copies of the data at other processors and to request forwarding of the data from the owner processor to the source processor. Here the operation completes only when all probes reach their destination processors and the data is received at the source processor.

Broadly stated, these prior systems rely on completion to impose inter-reference ordering. For instance, in a weakly-ordered system employing MB instructions, all pre-MB operations must be complete before the MB is passed and post-MB operations may be considered. Essentially, "completion" of an operation requires actual completion of all activity, including receipt of data and acknowledgments for probes, corresponding to the operation. Such an arrangement is inefficient and, in the context of inter-reference ordering, adversely affects latency.

SUMMARY OF THE INVENTION

The invention relates to a technique for reducing the latency of inter-reference ordering in a multiprocessor system wherein processor modules comprise at least two processors sharing a cache. According to the technique, each processor sharing a cache selectively inherits a commit-signal that is generated by control logic of the multiprocessor system in response to a memory reference operation issued by the other processor sharing that cache. The commit-signal facilitates inter-reference ordering; moreover, the commit signal indicates the apparent completion of the memory reference operation, rather than actual completion of the operation. Notably, the apparent completion of an operation occurs substantially sooner than the actual completion of an operation, thereby improving performance of the multiprocessor system.

In the illustrative embodiment, inter-reference ordering may be imposed by a memory barrier (MB) instruction inserted between memory reference instructions of a program executed by a processor. Execution of these instructions within the processor may cause out-of-order issuance and completion of external memory reference operations due to operational latencies throughout the system. To ensure correct implementation of the consistency model, prior systems inhibit program execution past the MB instruction until actual completion of all pre-MB operations have been confirmed to the processor. According to the present invention, however, program execution may proceed past the MB instruction once the commit signals for the operations have been received by the processor.

As described herein, the multiprocessing system may comprise (i) a symmetric multiprocessing (SMP) node wherein the processor and shared memory entities are interconnected by a local switch or (ii) a SMP system wherein a plurality of nodes are interconnected by a hierarchical switch. Each processor preferably has a private cache for storing data and changes to the data as a result of the memory reference operations are reflected among the entities via the transmission of probe commands in accordance with a conventional cache coherence protocol. Notably, associated with the system is an ordering point. Specifically, in the SMP node, the ordering point is associated with the local switch. In the SMP system, the ordering point is associated with the hierarchical switch.

As an example of a SMP node with an ownership-based, write-invalidate cache coherence protocol, a requesting processor issues a memory reference operation to the system requesting particular data. Upon determining which entity is the owner of the data and which entities have valid copies of the data, the ordering point totally orders the memory reference operation with respect to the other issued references using, e.g., a conventional arbitration or prioritization policy. Thereafter, the ordering point generates probes to invalidate any copies of the data at appropriate processors and/or to request forwarding of the data from the owner processor to the requesting processor, as required by the memory operation. Significantly, the ordering point also generates the commit-signal at this time for transmission to the requesting processor. Probes and commit signals are generated atomically for transmission to the appropriate processors. The net result is that all memory operations appear totally ordered.

Ordering of the requested memory reference operation with respect to memory references issued by other processors of the system constitutes a commit-event for the requested operation. For the SMP node embodiment, the commit-event is the point at which the memory reference operation is ordered at the local switch, whereas for the SMP system the commit-event occurs when the memory reference operation is ordered at the hierarchical switch. In accordance with the present invention, the commit-signal is preferably transmitted to the requesting processor upon the occurrence of, or after, such a commit-event.

Specifically, issuance of the memory reference operation by the requesting processor preferably increments a counter and receipt by the processor of the commit-signal responsive to the issued memory reference decrements the counter. When program execution reaches the MB instruction and the counter realizes a value of zero, the previously issued operations are considered committed and execution of the program may proceed past the MB. In accordance with the present invention where at least two processors share a cache, each processor has its own counter and each selectively inherits the other's commit-signal before it may proceed past the MB instruction.

As an example using an ownership-based, write-invalidate cache coherence protocol, a first processor accesses the shared cache for a data item. If the data is not present in the cache, the first processor issues a memory reference operation to the system requesting the data and increments its counter. The issued memory reference operation is ordered by the ordering point, a request for the data is forwarded (if necessary) to the appropriate entity and that entity returns the data to the shared cache. Substantially simultaneously, a commit-signal is generated by the ordering point in response to the issued operation and returned to the first processor. Meanwhile, a second processor accesses the shared cache for the data item and "hits" on the cache since the data has returned. If the commit-signal for the first processor's outstanding operation has yet to return, the second processor increments its counter to ensure that the inter-reference ordering imposed by the MB instruction is maintained. Once the commit-signal is received, each processor decrements its counter signifying that the operation has committed.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 10 illustrates an embodiment of a LoopComSig table;

DETAILED DESCRIPTION OF THE ILLUSTRATIVE EMBODIMENTS

As described herein, a hierarchical symmetric multi-processing (SMP) system includes a number of SMP nodes interconnected via a high performance switch. Each SMP node thus functions as a building block in the SMP system. Below, the structure and operation of an SMP node embodiment that may be advantageously used with the present invention is first described, followed by a description of the SMP system embodiment.

SMP Node

Figure 1:
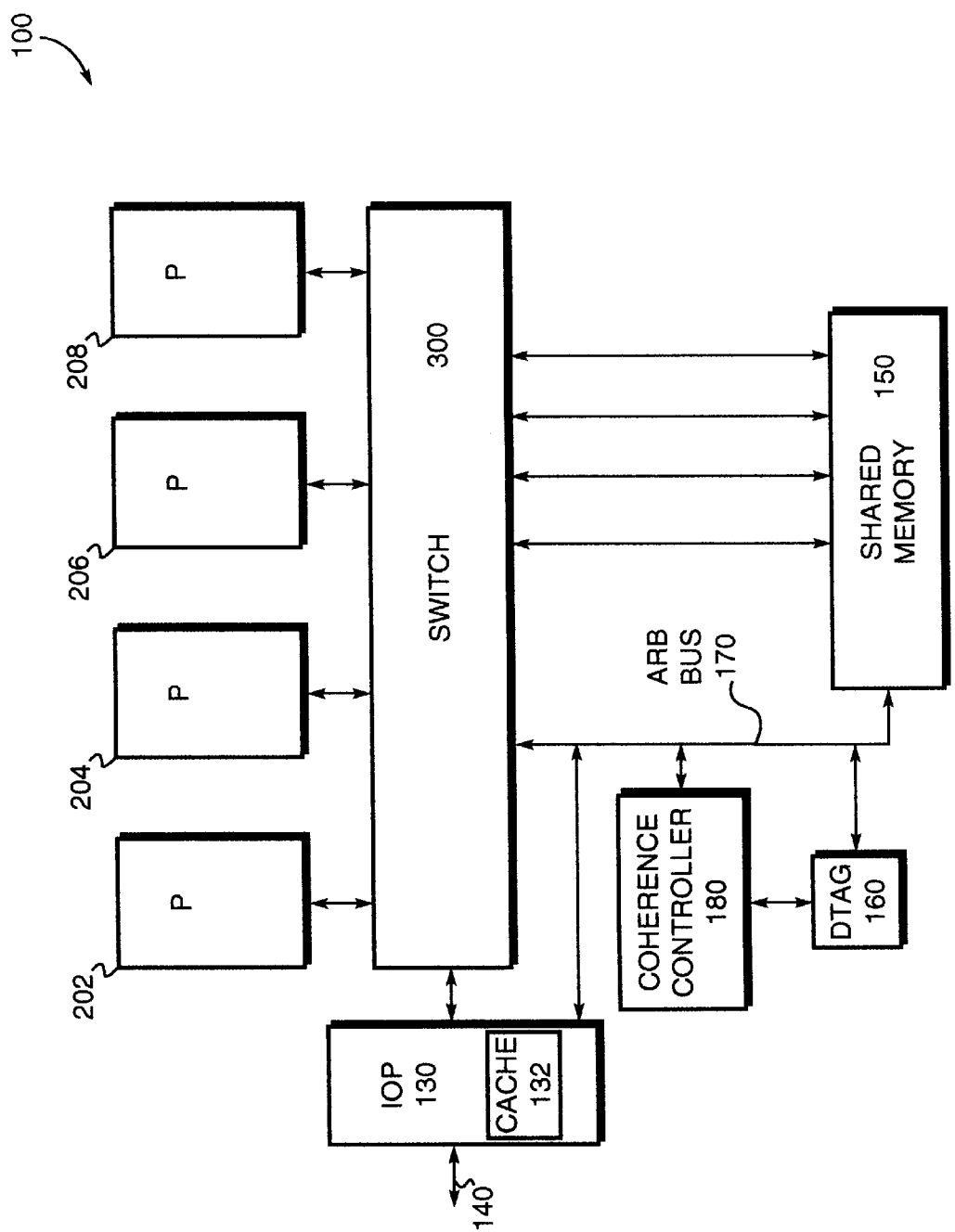
FIG. 1 is a schematic block diagram of a first multiprocessor node embodiment comprising a plurality of processor modules coupled to an input/output processor and a memory by a local switch.

FIG. 1 is a schematic block diagram of a first multiprocessing system embodiment, such as a small SMP node 100, comprising a plurality of processor modules (P) 202–208 coupled to an input/output (I/O) processor 130 and a memory 150 by a local switch 300. The memory 150 is preferably organized as a single address space that is shared by the processors and apportioned into a number of blocks, each of which may include, e.g., 64 bytes of data. The I/O processor, or IOP 130, controls the transfer of data between external devices (not shown) and the system via an I/O bus 140. Data is transferred between the components of the SMP node in the form of packets. As used herein, the term "system" refers to all components of the SMP node excluding the processors and IOP. In an embodiment of the invention, the I/O bus may operate according to the conventional Peripheral Computer Interconnect (PCI) protocol.

Figure 2:
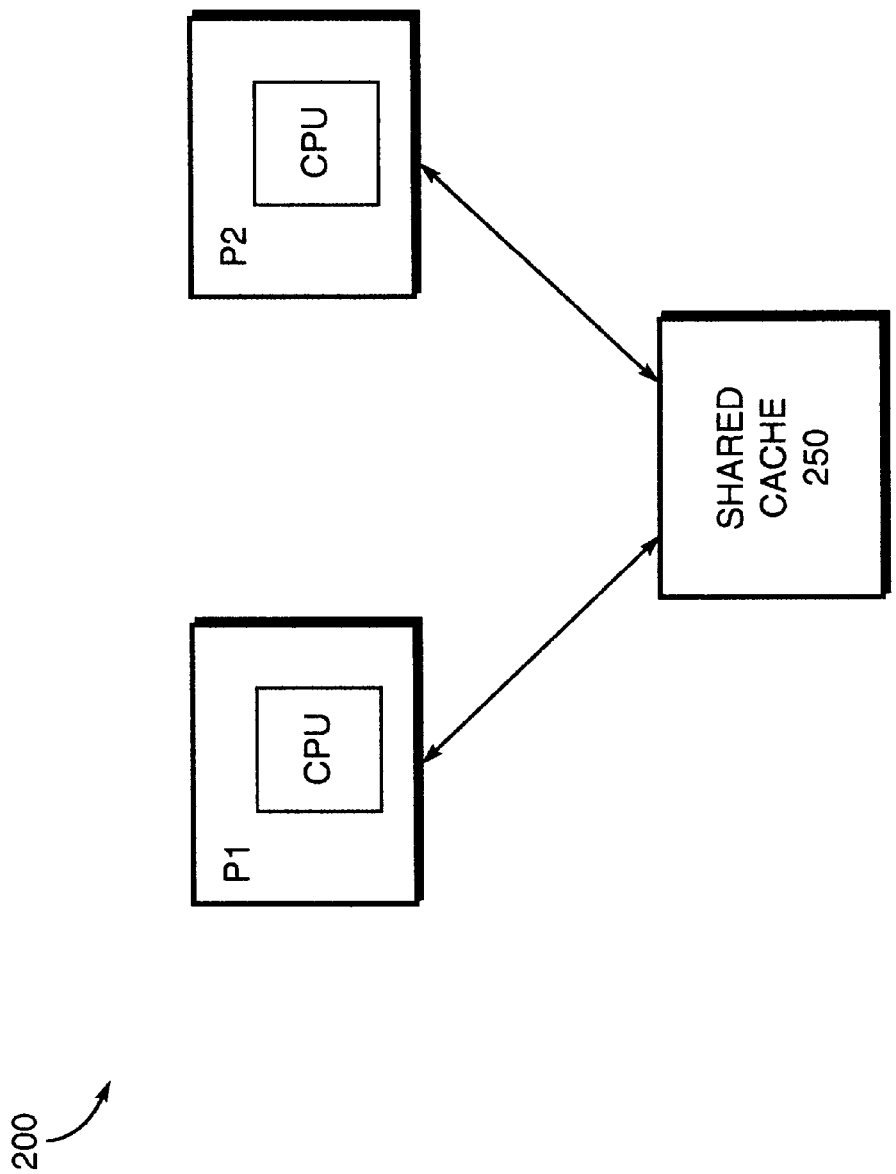
FIG. 2 is a schematic diagram of a processor module comprising at least two processors coupled to a shared cache.

FIG. 2 is a schematic diagram of a processor module 200 comprising at least two processors P1 and P2 coupled to a shared cache 250. Each processor is a modern processor comprising a central processing unit (CPU) that preferably incorporates a traditional reduced instruction set computer (RISC) load/store architecture. In the illustrative embodiment described herein, the CPUs are Alpha® 21264 processor chips manufactured by Digital Equipment Corporation®, although other types of processor chips may be advantageously used. For example in an alternate embodiment, each processor may comprise a multi-threaded modern processor capable of executing multiple threads of instructions.

The load/store instructions executed by the processors are issued to the system as memory reference, e.g., read and write, operations. Each operation may comprise a series of commands (or command packets) that are exchanged between the processors and the system. As described further herein, characteristics of modern processors include the ability to issue memory reference operations out-of-order, to have more than one memory reference outstanding at a time and to accommodate completion of the memory reference operations in arbitrary order.

In addition, each processor module 200 employs a cache 250 that is shared among its processors (or threads) and that stores data determined likely to be accessed in the future. The shared cache 250 is preferably organized as a write-back cache apportioned into, e.g., 64-byte cache lines accessible by the processors; it should be noted, however, that other cache organizations, such as write-through caches, may be used in connection with the principles of the invention. It should be further noted that memory reference operations issued by the processors are preferably directed to a 64-byte cache line granularity. Since the processors may update data from their shared cache without updating shared memory 150, a cache coherence protocol is utilized to maintain consistency among the caches.

The cache coherence protocol of the illustrative embodiment is preferably a conventional write-invalidate, ownership-based protocol. "Write-Invalidate" implies that when a processor modifies a cache line, it invalidates stale copies in other processors' caches rather than updating them with the new value. The protocol is termed an "ownership protocol" because there is always an identifiable owner for a cache line, whether it is shared memory, one of the processors or the IOP entities of the system. The owner of the cache line is responsible for supplying the up-to-date value of the cache line when requested. A processor/IOP may own a cache line in one of two states: "exclusively" or "shared". If a processor has exclusive ownership of a cache line, it may update it without informing the system. Otherwise, it must inform the system and potentially invalidate copies in the other caches.

A shared data structure 160 is provided for capturing and maintaining status information corresponding to the states of data used by the system. In the illustrative embodiment, the shared data structure is configured as a conventional duplicate tag store (DTAG) 160 that cooperates with the individual caches of the system to define the coherence protocol states of the data in the system. The protocol states of the DTAG 160 are administered by a coherence controller 180, which may be implemented as a plurality of hardware registers and combinational logic configured to produce a sequential logic circuit, such as a state machine. It should be noted, however, that other configurations of the controller and shared data structure may be advantageously used herein.

The DTAG 160, coherence controller 180, IOP 130 and shared memory 150 are interconnected by a logical bus referred to an Arb bus 170. Memory reference operations issued by the processors are routed via the local switch 200 to the Arb bus 170. The order in which the actual memory reference commands appear on the Arb bus is the order in which processors perceive the results of those commands. In accordance with this embodiment of the invention, though, the Arb bus 170 and the coherence controller 180 cooperate to provide an ordering point, as described herein.

The commands described herein are defined by the Alpha® memory system interface and may be classified into three types: requests, probes, and responses. Requests are commands that are issued by a processor when, as a result of executing a load or store instruction, it must obtain a copy of data. Requests are also used to gain exclusive ownership to a data item (cache line) from the system. Requests include Read (Rd) commands, Read/Modify (RdMod) commands, Change-to-Dirty (CTD) commands, Victim commands, and Evict commands, the latter of which specify removal of a cache line from a respective cache.

Probes are commands issued by the system to one or more processors requesting data and/or cache tag status updates. Probes include Forwarded Read (Frd) commands, Forwarded Read Modify (FRdMod) commands and Invalidate (Inval) commands. When a processor P issues a request to the system, the system may issue one or more probes (via probe packets) to other processors. For example if P requests a copy of a cache line (a Rd request), the system sends a probe to the owner processor (if any). If P requests exclusive ownership of a cache line (a CTD request), the system sends Inval probes to one or more processors having copies of the cache line. If P requests both a copy of the cache line as well as exclusive ownership of the cache line (a RdMod request) the system sends a FRd probe to a processor currently storing a dirty copy of a cache line of data. In response to the Frd probe, the dirty copy of the cache line is returned to the system. A FRdMod probe is also issued by the system to a processor storing a dirty copy of a cache line. In response to the FRdMod probe, the dirty cache line is returned to the system and the dirty copy stored in the cache is invalidated. An Inval probe may be issued by the system to a processor storing a copy of the cache line in its cache when the cache line is to be updated by another processor.

Responses are commands from the system to processors/ lOPs which carry the data requested by the processor or an acknowledgment corresponding to a request. For Rd and RdMod requests, the response is a Fill and FillMod response, respectively, each of which carries the requested data. For a CTD request, the response is a CTD-Success (Ack) or CTD-Failure (Nack) response, indicating success or failure of the CTD, whereas for a Victim request, the response is a Victim-Release response.

Figure 3:
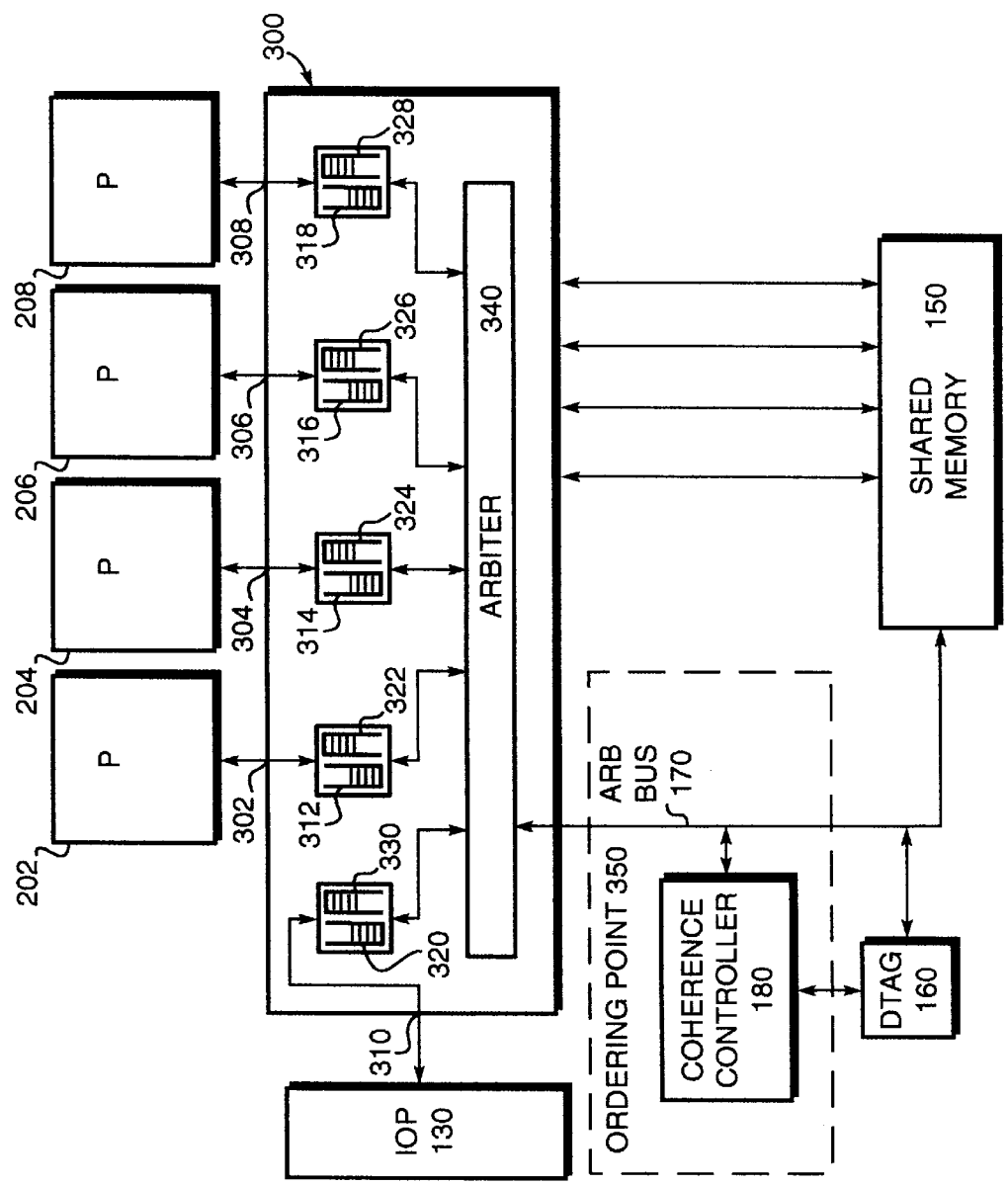
FIG. 3 is a schematic block diagram of the local switch comprising a plurality of ports coupled to the respective processor modules of FIG. 1.

FIG. 3 is a schematic block diagram of the local switch 300 comprising a plurality of ports 302–310, each of which is coupled to a respective processor module (P) 202–208 and IOP 130 via a full-duplex, bi-directional clock forwarded data link. Each port includes a respective input queue 312–320 for receiving, e.g., a memory reference request issued by its processor module and a respective output queue 322–330 for receiving, e.g., a memory reference probe issued by system control logic associated with the switch. An arbiter 340 arbitrates among the input queues to grant access to the Arb bus 170 where the requests are ordered into a memory reference request stream. In the illustrative embodiment, the arbiter selects the requests stored in the input queues for access to the bus in accordance with an arbitration policy, such as a conventional round-robin algorithm.

The following example illustrates the typical operation of multiprocessing system including switch 300. A Rd request for data item x is received at the switch 300 from P1 of, e.g., processor module 202, and loaded into input queue 312. The arbiter 340 selects the request in accordance with the arbitration algorithm. Upon gaining access to the Arb bus 170, the selected request is routed to the ordering point 350 wherein the states of the corresponding cache lines are interrogated in the DTAG 160. Specifically, the coherence controller 180 examines the DTAG to determine which entity of the system "owns" the cache line and which entities have copies of the line. If a processor of module 206 is the owner of the cache line x and a processor of module 208 has a copy, the coherence controller generates the necessary probes (e.g., a Fill x and Inval x) and forwards them to the output queues 326 and 328 for transmission to the processors.

Because of operational latencies through the switch and data paths of the system, memory reference requests issued by P1 may complete out-of-order. In some cases, out-of-order completion may affect the consistency of data in the system, particularly for updates to a cache line. Memory consistency models provide formal specifications of how such updates become visible to the entities of the multiprocessor system. In the illustrative embodiment of the present invention, a weak ordering consistency model is described, although it will be apparent to those skilled in the art that other consistency models may be used.

In a weakly-ordered system, inter-reference ordering is typically imposed by a memory barrier (MB) instruction inserted between memory reference instructions of a program executed by a processor. The MB instruction separates and groups those instructions of a program that need ordering from the rest of the instructions. The semantics of weak ordering mandate that all pre-MB memory reference operations are logically ordered before all post-MB references.

For example, the following program instructions are executed by P1 and P2:

| P1 | P2 |
|---|---|
| St x | Ld flag,0 |
| St y | MB |
| St z | Rd x |
| MB | Rd y |
| St flag,0 | Rd z |

In the case of P1's program, it is desired to store (via a write operation) all of the data items x, y and z before modifying the value of the flag; the programmer indicates this intention by placing the MB instruction after St z. According to the weak-ordering semantics, the programmer doesn't care about the order in which the pre-MB store instructions issue as memory reference operations, nor does she care about the order in which the post-MB references appear to the system. Essentially, the programmer only cares that every pre-MB store instruction appears before every post-MB instruction. At P2, a load (via a read operation) flag is performed to test for the value 0. Testing of the flag is ordered with respect to acquiring the data items x, y and z as indicated by the MB instruction. Again, it is not necessary to impose order on the individual post-MB instructions.

To ensure correct implementation of the consistency model, prior systems inhibit program execution past the MB instruction until actual completion of all pre-MB operations have been confirmed to the processor. Maintaining inter-reference order from all pre-MB operations to all post-MB operations typically requires acknowledgment responses and/or return data to signal completion of the pre-MB operations. The acknowledgment responses may be gathered and sent to the processor issuing the operations. The pre-MB operations are considered completed only after all responses and data are received by the requesting processor. Thus, referring to the example above with respect to operation of a prior multiprocessing system, once P1 has received the data and acknowledgment responses (e.g., an Inval acknowledgment) corresponding to an operation, the operation is considered complete.

However, each memory reference operation may consist of a number of commands; the latency of inter-reference ordering is a function of the extent to which each command must complete before the reference is considered ordered. The present invention relates to a technique for reducing the latency of inter-reference ordering in a multiprocessor system wherein processor modules comprise at least two processors sharing a cache. According to the technique, each processor sharing a cache selectively inherits a commit-signal that is generated by control logic of the multiprocessor system in response to a memory reference operation issued by the other processor sharing that cache.

Figure 4:
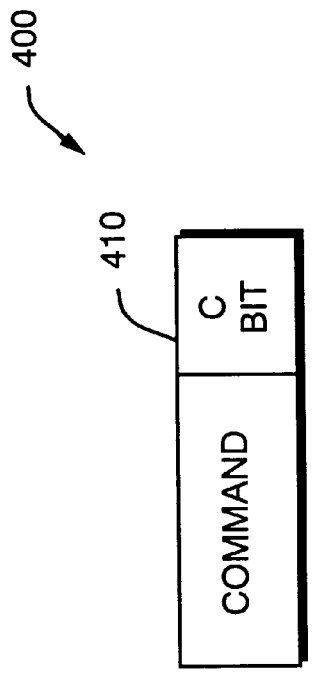
FIG. 4 is a schematic diagram of an embodiment of a commit-signal implemented as a special probe-type, commit-signal packet.

FIG. 4 is a schematic diagram of an embodiment of the commit-signal that is preferably implemented as a commit-signal packet structure 400 characterized by the assertion of a single, commit-signal ("C") bit 410. It will be apparent to those skilled in the art that the commit-signal 400 may be manifested in a variety of forms, including a discrete signal on a wire, or, in another embodiment, a packet identifying the operation corresponding to the commit-signal. Program execution may proceed past the MB instruction once commit-signals for all pre-MB operations have been received by the processor, thereby increasing the performance of the system. The commit-signal facilitates inter-reference ordering; in addition, the novel signal indicates the apparent completion of the memory reference operation, rather than actual completion of the operation. Notably, the apparent completion of an operation occurs substantially sooner than the actual completion of an operation, thereby improving performance of the multiprocessor system.

Referring again to the above example including the program instructions executed by P1, generation of a commit-signal by the ordering point 350 in response to each RdMod request for data items x, y and z (corresponding to each store instruction for those data items) issued by P1 occurs upon successful arbitration and access to the Arb bus 170, and total ordering of those requests with respect to all memory reference requests appearing on the bus. Total ordering of each memory reference request constitutes a commit-event for the requested operation. The commit-signal 400 is preferably transmitted to P1 upon the occurrence of, or after, the commit-event.

The ordering point 350 determines the state of the data items throughout the system and generates probes (i.e., probe packets) to invalidate copies of the data and to request forwarding of the data from the owner to the requesting processor P1. For example, the ordering point may generate FRdMod probe to the processor of module 206 (i.e., the owner) and Inval probes to the processors of modules 204 and 208. The ordering point also generates the commit-signal at this time for transmission to the P1. The commit-signal and probe packets are loaded into the output queues and forwarded to the respective processors in single, first-in, first-out (FIFO) order; in the case of P1, the commit-signal is loaded into queue 322 and forwarded to P1 along with any other probes pending in the queue. As an optimization, the commit-signal 400 may be "piggy backed" on top of one of these probe packets; in the illustrative embodiment of such an optimization, the C-bit of a probe packet may be asserted to indicate that a commit-signal is being sent.

Specifically, issuance of the memory reference operation by the requesting processor preferably increments a counter and receipt by the processor of the commit-signal responsive to the issued memory reference decrements the counter. When program execution reaches the MB instruction and the counter realizes a value of zero, the previously issued operations are considered committed and execution of the program may proceed past the MB.

Figure 5:
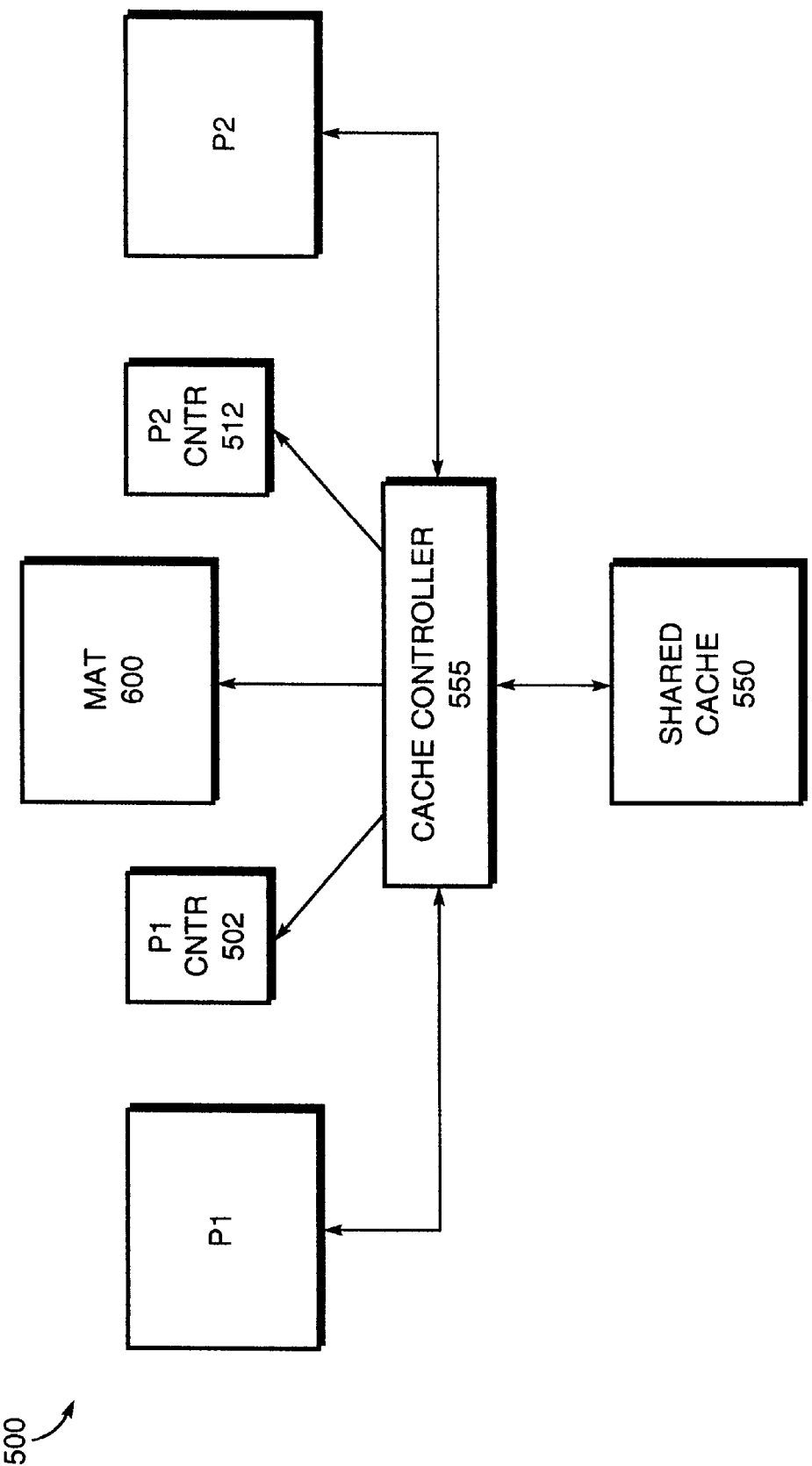
FIG. 5 is a schematic diagram of an illustrative embodiment of a processor module including a miss address table (MAT) used for implementing a novel commit-signal inheriting technique in accordance with the invention.

In accordance with the present invention where at least two processors share a cache, each processor has its own counter and each selectively inherits the other's commit-signal before it may proceed past the MB instruction. FIG. 5 is a schematic diagram of an illustrative embodiment of a processor module 500 comprising at least two processors P1 and P2 coupled to a shared cache 550 wherein each processor has an associated counter (denoted P1 Cntr 502 and P2 Cntr 512). For the alternate embodiment of the present invention wherein the processor (P1 and/or P2) is a multi-threaded processor, there is a counter associated with each thread of execution issued by the processor. It will be apparent to those skilled in the art that the principles of the inventive technique described herein apply similarly to this alternate embodiment.

In FIG. 5, if P1 accesses the shared cache 550 to, e.g., read data item x and the data x is not present in the cache (generating a "cache miss" access), P1 issues a memory reference operation to the system requesting the data. In response to the issued operation, a cache controller 555 increments the P1 counter 502. The issued memory reference operation is ordered by the ordering point 350, a request for the data is forwarded to the appropriate processor entity and that entity returns the data to the shared cache 550. Substantially simultaneously, a commit-signal 400 is generated by the ordering point 350 in response to the issued operation and returned to P1.

Meanwhile, P2 accesses the shared cache 550 in response to a load (Ld) x instruction and finds that, since the data has returned as a result of P1's read operation, it is present in the cache (generating a "cache hit" access). If the commit-signal for P1's outstanding operation has yet to return, the cache controller 555 increments the P2 counter 512 to ensure that the inter-reference ordering imposed by the MB instruction is maintained. For example, execution of a next instruction by P2 may be inhibited (if the next instruction is a MB instruction) until return of the commit-signal in response to the issued memory reference operation. Once the commit-signal 400 for the outstanding operation is received, the controller 555 decrements each counter signifying that the operation has committed.

Figure 6:
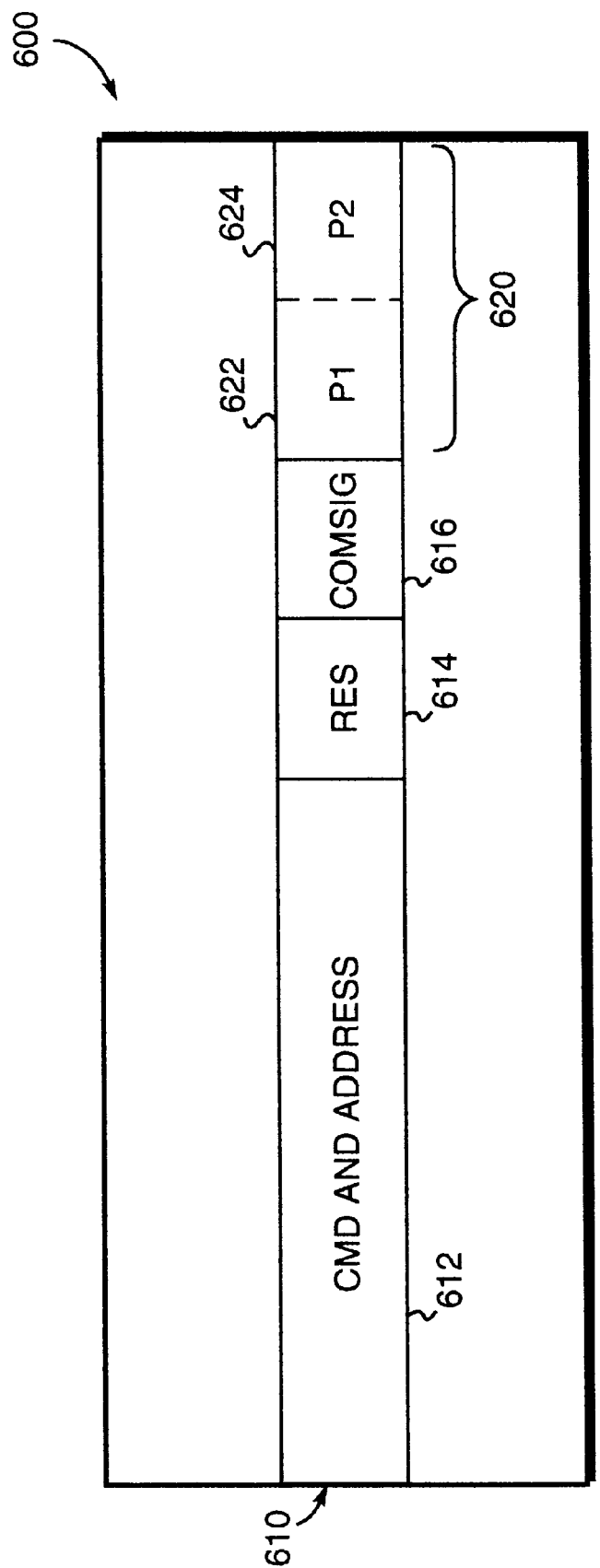
FIG. 6 is a schematic diagram of the MAT in accordance with the invention.

In the illustrative embodiment, the technique is implemented using a novel miss address table (MAT) 600 associated with the shared cache 550. FIG. 6 is a schematic diagram of the MAT 600 which preferably comprises a table of requests that are outstanding to the cache, although other structures for storing such requests may be used. The MAT 600 contains a number of entries 610, each of which corresponds to a memory reference operation that is outstanding from the cache. Each entry 610 comprises a Cmd and Address field 612 containing the command and address of the outstanding memory reference operation, a Res field 614 containing a 1-bit response flag that indicates whether the data for the cache entry is present in the cache 550, a ComSig field 616 containing a 1-bit commit-signal flag that indicates whether the commit-signal 400 has returned for the particular entry 610, and a ComSig report vector field 620. The report vector field (hereinafter "report vector") is preferably manifested as a plurality of bits, each of which is associated with a processor (or thread of execution) sharing the cache. For example, bit 622 is associated with processor P1 and bit 624 is associated with processor P2. Assertion of a bit in the report vector field 620 indicates that the counter for the associated processor (or thread) must be decremented when the commit-signal 400 for the outstanding operation returns.

Referring again to the example above, when P1 "misses" on the cache and issues the memory reference operation, the cache controller 555 allocates an entry 610 in the MAT 600 for the outstanding operation. Later when P2 executes the Ld x instruction and finds that data x is present, the controller 555 indexes into the appropriate MAT entry 610 (via the address x) and discovers that the entry is still outstanding because, e.g., the ComSig flag 616 is not asserted. P2 must then inherit P1's commit-signal. Accordingly, the cache controller asserts bit 624 in the report vector 620, increments the P2 counter 512 and provides the data value of x to P2. When the commit-signal for the outstanding operation returns, the controller decrements both counters 502 and 512.

As another example, assume P1 accesses the cache 550 for a load x and the data x is not present. P1 generates a memory reference operation, e.g., Rd x, to acquire the data. The cache controller 555 creates an entry 610 in the MAT 600, loads the operation and address (Rd x) into field 612 and sets the P1 bit 622 in the report vector 620. Thereafter, the data is provided to the cache (via a Fill x) from the system and the commit-signal 400 returns before P2 attempts to access the cache for data x. The cache controller 555 indexes into the MAT 600, clears the P1 bit 622 in the report vector, decrements the P1 counter 502, and asserts both the response flag 614 and the ComSig flag 616. Note that when both response and ComSig flags are set, the entry is satisfied and it may be deleted from the table. In this case, there is no inheriting of commit-signals between P1 and P2.

Assume that while P1's memory reference operation (Rd x) is outstanding, P2 accesses the cache for data x and the data has not yet returned. P2 thus "misses" on the cache. The cache controller 555 examines the MAT 600 and locates a previously allocated entry 610 for x. Thus P2 does not issue a memory reference operation to the system; instead, the cache controller asserts the P2 bit 624 in the report vector 620 and increments the P2 counter 512. When the commit-signal 400 for P1's outstanding operation returns, the controller 555 asserts the ComSig flag 616 and decrements the counters 502 and 512. When the fill-data returns, the controller asserts the response flag 614 and provides the data to P1 and P2. The cache controller 555 then deletes the MAT entry 610 because the response and ComSig flags are asserted. In this case, the overlap between P1's and P2's operations was such that data for P1's operation had not returned at the time that P2 accessed the shared cache.

SMP System

Figure 7:
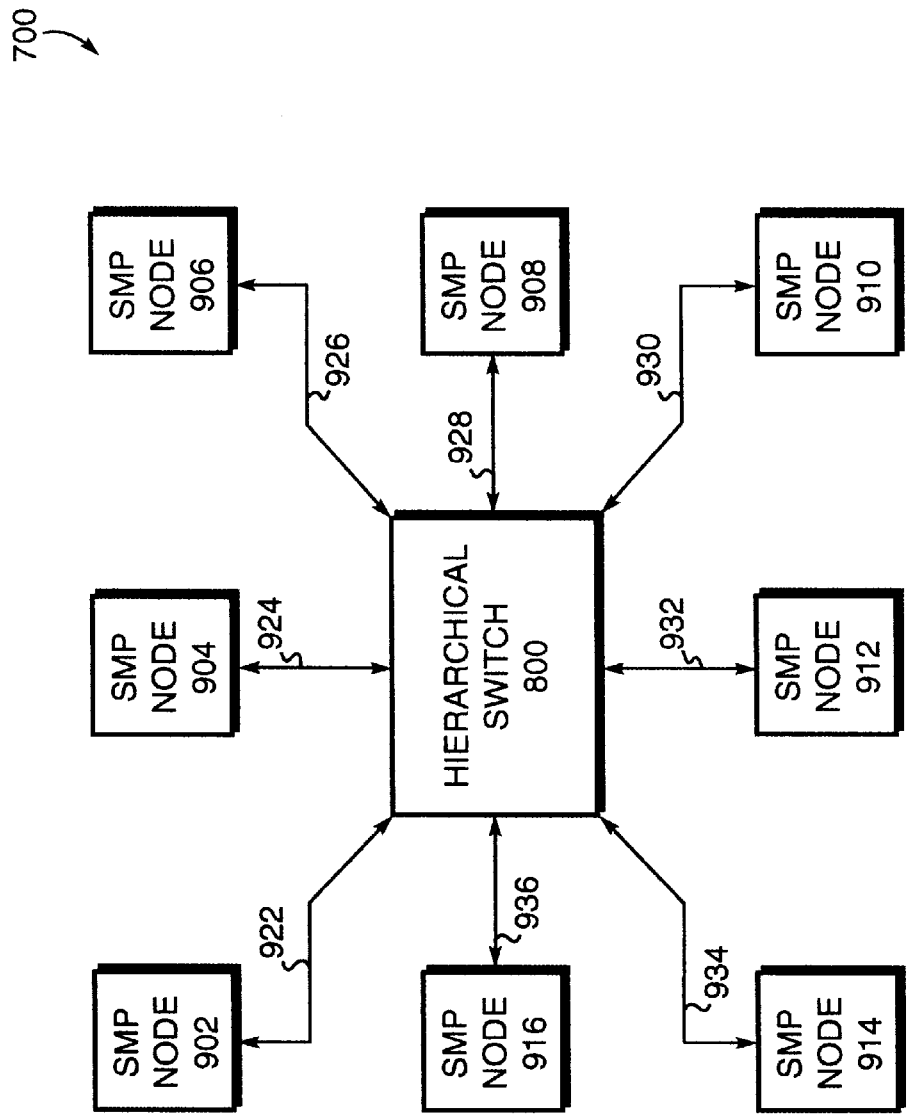
FIG. 7 is a schematic block diagram of a second multi-processing system embodiment comprising a plurality of multiprocessor nodes interconnected by a hierarchical switch which may be advantageously used with the present invention.

FIG. 7 is a schematic block diagram of a second multi-processing system embodiment, such as a large SMP system 700, comprising a plurality of SMP nodes 902–916 interconnected by a hierarchical switch 800. Each of the nodes is coupled to the hierarchical switch by a respective full-duplex, bidirectional, clock forwarded hierarchical switch (HS) link 922–936. Data is transferred between the nodes in the form of packets. In order to couple to the hierarchical switch, each SMP node is augmented to include a global port interface. Also, in order to provide a distributed shared memory environment, each node is configured with an address space and a directory for that address space. The address space is generally partitioned into memory space and IO space. The processors and IOP of each node utilize private caches to store data strictly for memory-space addresses; 10 space data is not cached in private caches. Thus, the cache coherency protocol employed in system 700 is concerned solely with memory space commands.

As used herein with the large SMP system embodiment, all commands originate from either a processor or an IOP, where the issuing processor or IOP is referred to as the "source processor." The address contained in a request command is referred to as the "requested address." The "home node" of the address is the node whose address space maps to the requested address. The request is termed "local" if the source processor is on the home node of the requested address; otherwise, the request is termed a "global" request. The Arb bus at the home node is termed the "home Arb bus". The "home directory" is the directory corresponding to the requested address. The home directory and memory are thus coupled to the home Arb bus for the requested address.

A memory reference operation (request) emanating from a processor or IOP is first routed to the home Arb bus. The request is routed via the local switch if the request is local; otherwise, it is considered a global request and is routed over the hierarchical switch. In this latter case, the request traverses the local switch and the GP link to the global port, passes over the HS link to the hierarchical switch, and is then forwarded over the GP link and local switch of the home node to the home Arb bus.

Figure 8:
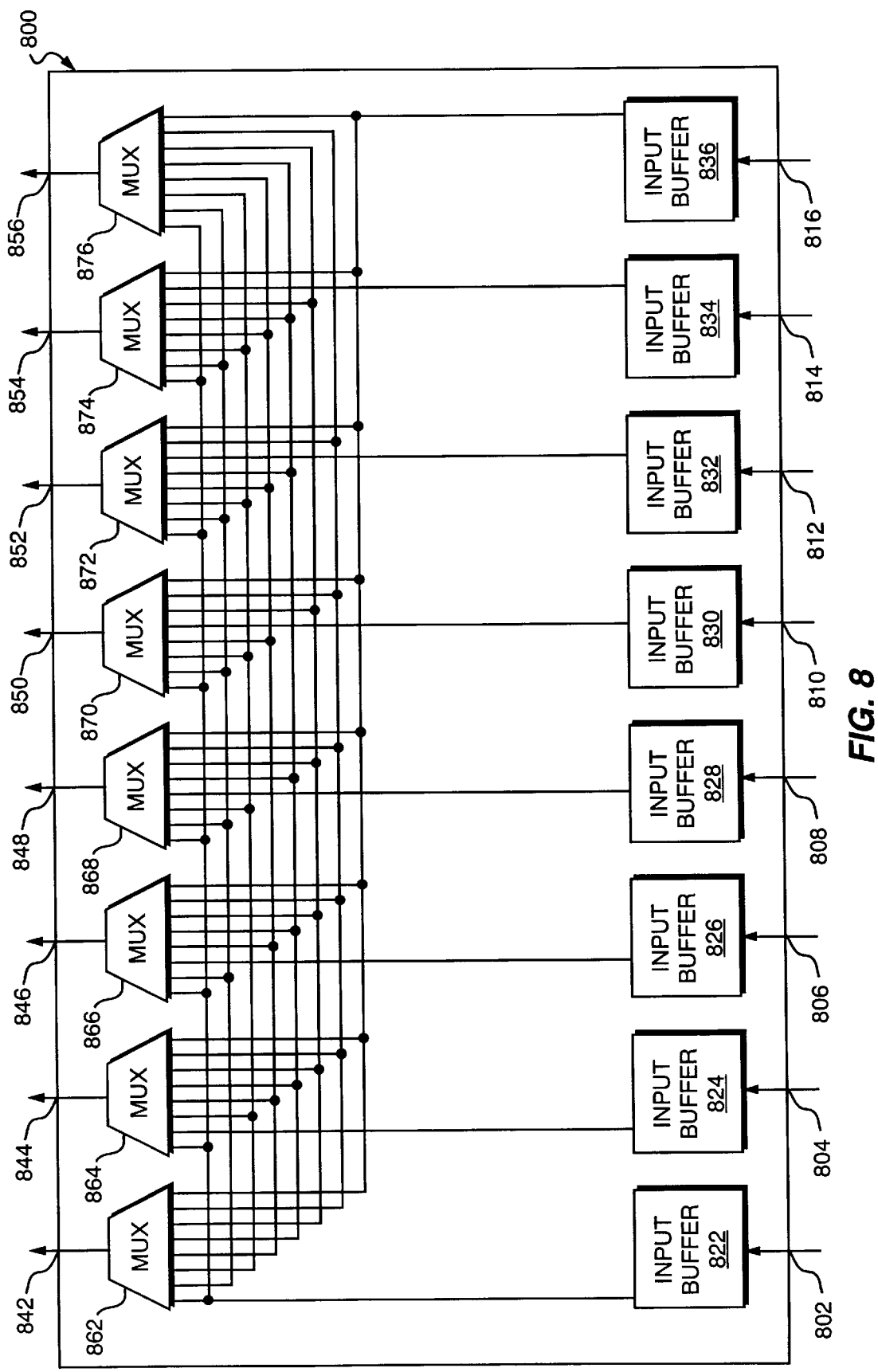
FIG. 8 is a schematic block diagram of the hierarchical switch.

FIG. 8 is a schematic block diagram of the hierarchical switch 800 comprising a plurality of input ports 802–816 and a plurality of output ports 842–856. The input ports 802–816 receive command packets from the global ports of the nodes coupled to the switch, while the output ports 842–856 forward packets to those global ports. In the illustrative embodiment of the hierarchical switch 800, associated with each input port is an input (queue) buffer 822–836 for temporarily storing the received commands. Although the drawing illustrates one buffer for each input port, buffers may be alternatively shared among any number of input ports. An example of a hierarchical switch (including the logic associated with the ports) that is suitable for use in the illustrative embodiment of the invention is described in copending and commonly-assigned U.S. patent application Ser. No. 08/957,298, filed Oct. 24, 1997 and titled, *Order Supporting Mechanism For Use In A Switch-Based Multi-Processor System*, which application is hereby incorporated by reference as though fully set forth herein.

In the large SMP system, the ordering point is associated with the hierarchical switch 800. According to the present invention, the hierarchical switch 800 is configured to support novel ordering properties in order that commit signals may be gainfully employed. The ordering properties are imposed by generally controlling the order of command packets passing through the switch. For example, command packets from any of the input buffers 822–836 may be forwarded in various specified orders to any of the output ports 842–856 via multiplexer circuits 862–876.

As described herein, the ordering properties apply to commands that contain probe components (Invals, FRds, and FrdMods); these commands are referred to as probe-type commands. One ordering property of the hierarchical switch is that it imposes an order on incoming probe-type commands. That is, the switch enqueues the commands into a logical FIFO queue based on time of arrival. For packets that arrive concurrently (in the same clock), the switch chooses an arbitrary order and places them in the FIFO queue. A second ordering property of the switch is its ability to "atomically" multicast all probe-type packets. All probe-type packets are multicast to target nodes as well as to the home node and the source node. In this context, "atomic multicast" means that for any pair of probe-type commands A and B, either all components of A appear before all components of B or vice versa. Together, these two properties result in a total ordering of all probe-type packets. The total ordering is accomplished using the input buffers in conjunction with control logic and multiplexers.

Figure 9:
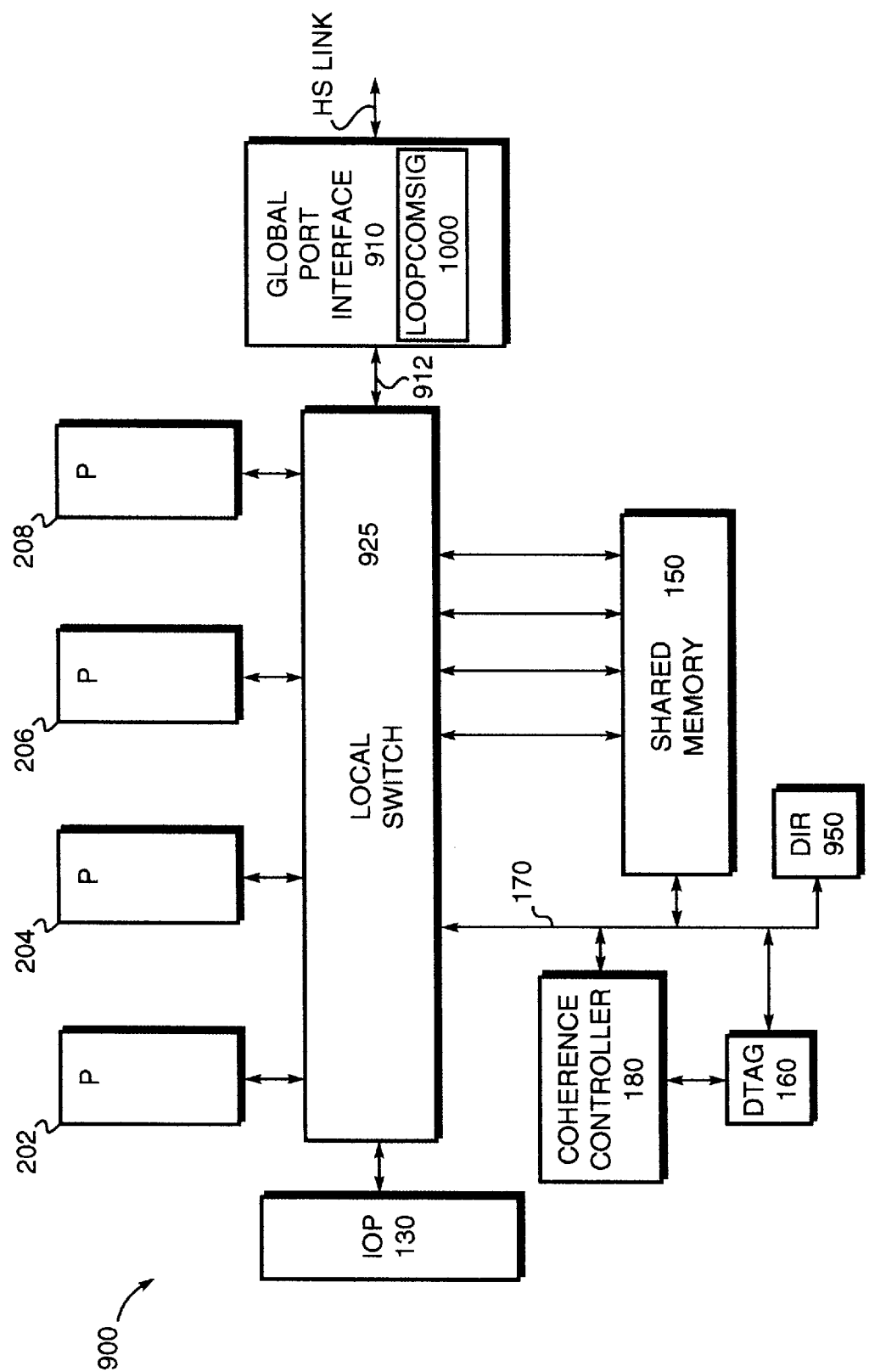
FIG. 9 is a schematic block diagram of an augmented multiprocessor node comprising a plurality of processors interconnected with a shared memory, an IOP and a global port interface via a local switch.

FIG. 9 is a schematic block diagram of an augmented SMP node 900 comprising a plurality of processors (P) 202–208 interconnected with a shared memory 150, an IOP 130 and a global port interface 910 via a local switch 925. The processor, shared memory and IOP entities are similar to the those entities of FIG. 1. The local switch 925 is augmented (with respect to switch 300) to include an additional port coupling the interface 910 by way of a full-duplex, clock forwarded global port (GP) data link 912. In addition to the DTAG 160, an additional shared data structure, or directory (DIR) 950, is coupled to Arb bus 170 to administer the distributed shared memory environment of the large system 700.

The global port interface 910 includes a loop commit-signal (LoopComSig) table 1000 for monitoring outstanding probe-type commands from the SMP node. All probe-type commands are multicast by the hierarchical switch to all target nodes as well as to the home node and the source node. The component sent to the source node serves as the commit signal whereas the one to the home node (when the home node is not the source node) serves as the probe-delivery-acknowledgment (probe-ack). In the illustrative embodiment, the LoopComSig table 1000 is implemented as a content addressable memory device, although other configurations and structures of the table may be used. Each time a probe-type command is sent to the global port, an entry is created in the LoopComSig table; when a corresponding probe-ack returns to the node's Arb bus, the entry is cleared.

Thus, the LoopComSig table is used to determine if a probe-type command corresponding to a particular address x is outstanding from the node at any specific time. This information is used to optimize the generation of ComSigs for local commands as follows: In the case of a local command appearing on the home Arb bus, if the coherence controller determines that no probe-type commands need to be sent to other nodes and if there are no outstanding probe-type commands as indicated by the LoopComSig table, then the commit-signal is sent directly to the source processor. In the embodiment that does not include the LoopComSig table, commit signals for local commands always originate at the hierarchical switch. Using the LoopComSig table, the coherence controller is able to generate commit signals locally and hence reduce the latency of commit signals for a substantial fraction of local commands.

Note that although the table 1000 is physically located on the global port interface 910, it may be logically resident on the Arb bus 170 along with the other shared data structures. The DIR, DTAG and LoopComSig table cooperate to maintain coherency of cache lines in the SMP system. That is, the DTAG captures all of the state required by the small SMP node cache coherence protocol while the DIR captures the coarse state for the large SMP system protocol; the LoopComSig table captures state information at a finer level. Each of these components interfaces with the global port interface 910 to provide coherent communication between the SMP nodes coupled to the hierarchical switch.

Thus when a request R arrives at the home Arb bus, the DIR, DTAG and LoopComSig states are examined in order to generate probe commands to other processors and/or response commands to the source processor. Further, the states of the DIR, DTAG and LoopComSig are atomically updated to reflect the serialization of the request R. As noted, the home Arb bus is defined as the serialization point for all requests to a memory address. For each memory address x, store instructions appear to have been executed in the order in which their corresponding requests (RdMods or CTDs) arrive at the home Arb bus. Load instructions to address x will receive the version of x corresponding to the store x most recently serialized at the home Arb.

FIG. 10 illustrates an embodiment of the LoopComSig table 1000 containing a plurality of entries 1010, each of which includes an address field 1012 and a number of status bits 1020. The address field 1012 stores the address of the cache line for a probe-type command that is currently outstanding. The status bits 1020 reflect the status of the outstanding command; alternatively, the status bits may be used to reflect various properties of the outstanding operation. For example, the Valid bit 1022 indicates whether the allocated entry is valid, thus denoting that this is a probe-type command with outstanding probe-acks. Note that not all of the status bits that may be included in the LoopComSig table 1000 have been shown. Rather, those status bits that have relevance to the description herein have been shown. In addition, it is envisioned that other status bits may be alternatively provided as deemed necessary to maintain memory coherency, and thus the present invention should not be limited to any particular assignment of bits in the LoopComSig table.

Referring again to FIGS. 7 and 9, the shared memory address space is preferably distributed among the nodes and directories associated with those nodes. That is, the memory and directory of node 902 may contain addresses 1–1000, the memory and directory for node 904 may contain addresses 1001–2000, the memory and directory for node 606 may contain addresses 2001–3000 and the memory and directory for node 908 may contain addresses 3001–4000, etc. However, each processor in each node may issue commands to access data in any portion of the shared memory system. That is, the commands may be handled entirely within the node of the issuing processor (i.e., the source node) or may be transmitted to other nodes in the system based on the address and type of command.

Each processor of the system 700 may access portions of shared memory stored at its home node, or at any other SMP node. When a processor accesses (reads or writes) a shared memory cache line for which the home node is the processor's own node, the memory reference is referred to as a "local" memory reference. When the reference is to a cache line for which the home node is a node other than the processor's node, the reference is referred to as a remote or "global" memory reference. Because the latency of a local memory access differs from that of a remote memory access, the SMP system 700 is said to have a non-uniform memory access (NUMA) architecture. Further, since the system provides coherent caches, the system is often called a cache-coherent NUMA (CC-NUMA) system. In the illustrative embodiment of the invention, the large SMP system 700 is preferably referred to as a distributed shared memory system, although it may also be considered equivalent to the above classes of systems. Also the processor consistency model described herein for the large SMP system is preferably weak ordering, although other processor consistency models such as sequential or release consistency may be used.

The shared memory system 700 disclosed herein includes several inventive aspects that contribute to its high performance and low complexity. One such aspect is its adherence to and exploitation of order among command packets exchanged throughout the system. By guaranteeing that these packets flow through the system in accordance with certain ordering properties, latencies of operations can be substantially reduced. For instance, a RdMod request does not require that Inval probes be delivered to their destination processors before the operation is considered committed; instead, the operation is considered committed as soon as a commit-signal has been delivered to the requesting processor. Furthermore, by guaranteeing that certain orders are maintained, the inventive system eliminates the need for acknowledgment responses. These probe-type commands and responses are guaranteed to reach their destinations in the order in which they are "totally ordered" within the hierarchical switch of the system and thereafter enqueued to queues of the destination nodes. These aspects of the invention improve the bandwidth of the system.

Figure 11:
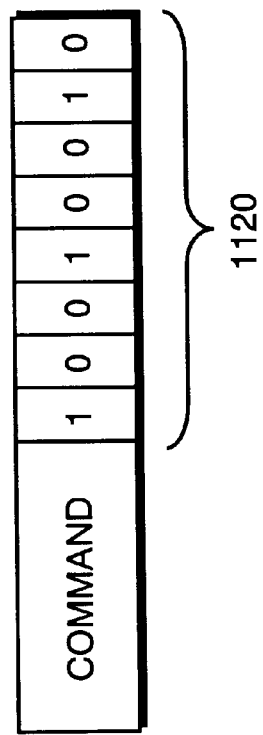
FIG. 11 is a schematic diagram of an incoming command packet modified with a multicast-vector.

Specifically, novel ordering properties of the hierarchical switch are gainfully employed to reduce the latency of inter-reference ordering and, more specifically, the latency of the inventive commit-signals with respect to the MB instruction. One ordering property of the hierarchical switch is that it imposes an order on incoming probe-type commands. That is, it enqueues them into a logical FIFO queue based on time of arrival. For packets that arrive concurrently (in the same clock), it picks an arbitrary order and places them in tappFIFO queue. The target nodes are specified using a multicast-vector appended to the beginning of each packet. FIG. 11 is a schematic diagram of an incoming command packet 1100 modified with a multicast-vector 1120. The multicast-vector 1120 is basically a mask comprising a plurality of 1-bit fields, each of which corresponds to an output port of the hierarchical switch; those output ports selected to receive the incoming command packet 1100 from an input port of the switch have their respective bit fields asserted. Thus it can be appreciated that although the hierarchical switch is capable of multicasting selected incoming packets 1100, use of the appended multicast-vector 1120 may be extended to allow unicasting (by asserting only 1-bit of the multicast-vector) and broadcasting (by asserting all bits of the multicast-vector) of incoming command packets.

Figure 12:
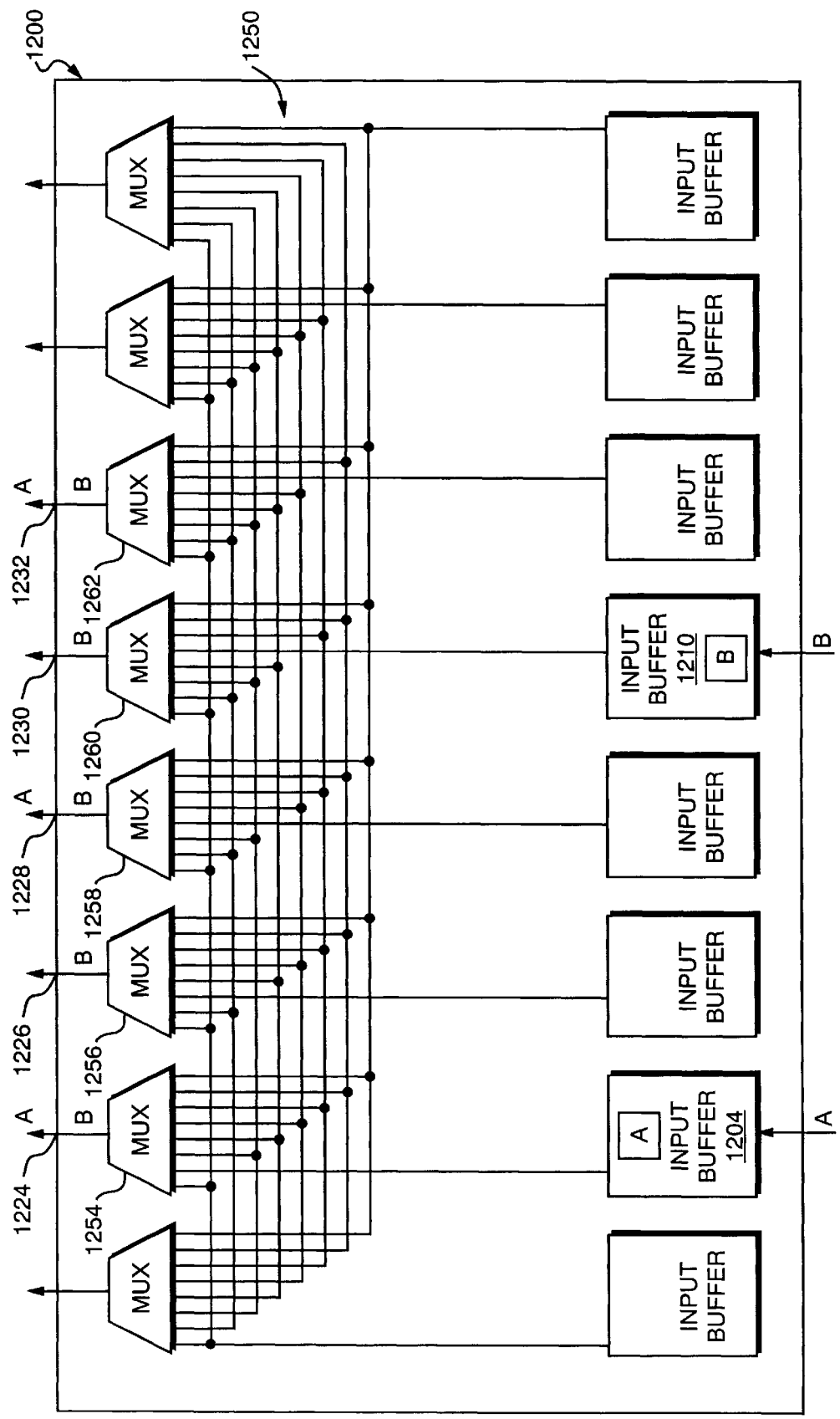
FIG. 12 is a schematic block diagram illustrating a total ordering property of an illustrative embodiment of the hierarchical switch.

A second ordering property of the hierarchical switch is that all incoming probe-type packets are "atomically" multicasted or totally ordered. That is, the hierarchical switch totally orders incoming probe-type packets such that it appears that the packets arrived in some defined order; moreover, that defined order is reflected at all nodes of the system via the output ports (and input buffers) of the switch. FIG. 12 is a schematic block diagram illustrating the total ordering property of an illustrative embodiment of the hierarchical switch 1200. Incoming command packets A, B are copied to selected output ports 1224–1232 from their respective input buffers 1204–1210 via multiplexers 954–962 of the hierarchical switch as specified by their appended multicast vectors. In the illustrative embodiment, the ordering point 1250 of the switch 1200 preferably comprises the input buffers and multiplexer circuits.

In accordance with the novel total ordering property of the hierarchical switch, packets A and B must appear in the same order at the selected output ports as they appear in their input buffers without interleave or re-order at the different output ports. That is, the atomic nature of total ordering requires that the incoming packets appear in some defined order as determined by the hierarchical switch and that order is maintained among all of the output ports. For example, all copies of packet A are passed through the selected multiplexers 1254, 1258 and 1262, to the output ports 1224, 1228 and 1232, and then forwarded to their destinations before all copies of packet B are passed through the selected multiplexers 1254–1262 and output ports 1224–1232. In addition, none of the copies of packet A may be interleaved with copies of packet B so as to effectively destroy the ordering of the packets at the output ports. The hierarchical switch functions to essentially treat all copies of packet A before all copies of packet B (or vice-versa); whatever order is chosen, the atomic total ordering process must be followed.

In the illustrative embodiment, the switch chooses an order based on (i) the time of arrival of incoming packets at the input ports of the switch or (ii) any arbitrary prioritization policy when two or more incoming packets are received at input ports at the same time. Thus in the former case, if A is the first incoming packet received at an input port of the switch, A is the first packet ordered. In the latter case, however, if packets A and B arrive simultaneously at the switch, packet A may be totally ordered before packet B if, e.g., A was transmitted from a node having a lower node number than B. Total ordering of packets is further accomplished per clock cycle to avoid inter-ordering with packets arriving at the switch during subsequent clock cycles. Here, initial packets A and B are totally ordered during an initial clock cycle so that subsequent command packets arriving during a subsequent clock cycle cannot be ordered before those initial packets.

All probe-type commands, probe-acks, commit signals, and victim commands travel preferably in a FIFO order through the hierarchical switch to the Arb bus on the destination node. Implementing this rule does not require any additional hardware components; however, the rule is key to the invention. It guarantees that for any pair of memory reference operations R1 and R2, from processors P1 and P2 located anywhere in the system, if R1 is ordered before R2 by the hierarchical switch, then all probes corresponding to R1 are ahead of the commit signal for R2. Thus, when the commit signal for R2 reaches the source processor P2, all probes corresponding to R1 have been received by P2. Consequently, if P2 orders another reference R3 after the receipt of the commit signal for R2, then R3 is ordered after R1. The above rule provides the apparent order required by the consistency model, but does so without requiring that pre-MB operations complete before post-MB operations may be issued.

In summary, the novel inheritance technique described herein may apply to the large SMP system embodiment described herein, or any similar system embodiment having a SMP node that comprises at least one processor module with a plurality of processors (or threads) sharing a cache. In the context of a weakly-ordered system employing commit-signals as described herein, each processor must inherit the other "sharing" processor's commit-signal for outstanding pre-MB memory reference operations before proceeding past an MB instruction so as to maintain the inter-reference order imposed by the MB instruction. For a sequentially consistent system employing commit-signals, each processor must likewise inherit the other processor's commit-signal for a previous outstanding memory reference operation as described above before proceeding to a next memory reference operation.

While there has been shown and described an illustrative embodiment for reducing the latency of inter-reference ordering in a multiprocessor system wherein processor modules comprise at least two processors sharing a cache, it is to be understood that various other adaptations and modifications may be made within the spirit and scope of the invention. For example in alternate embodiments of the invention, configurations of the large SMP system may include any topology such as a mesh, cube, etc., each of which comprises a structure for interconnecting a plurality of small SMP nodes in a manner similar to the large SMP embodiment described herein.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for reducing the latency of inter-reference ordering in a multiprocessor system having at least one processor module with at least first and second processors sharing a cache, the method comprising the steps of:

issuing a first memory reference operation to the system from the first processor for a data item in response to a cache miss at the shared cache;

providing the data item to the shared cache in response to the issued first memory reference operation;

generating a cache hit at the shared cache in response to a cache access for the data item by the second processor; and at the second processor, selectively inheriting a commit-signal generated by control logic of the multiprocessor system in response to the issued first memory reference operation to maintain the reduced inter-reference ordering in the system.

2. A method for reducing the latency of inter-reference ordering in a multiprocessor system having at least one processor module with a multi-threaded processor having first and second threads of instructions sharing a cache, the method comprising the steps of:

issuing a first memory reference operation to the system from the first thread for a data item in response to a cache miss at the shared cache;

providing the data item to the shared cache in response to the issued first memory reference operation;

generating a cache hit at the shared cache in response to a cache access for the data item by the second thread; and at the second thread, selectively inheriting a commit-signal generated by control logic of the multiprocessor system in response to the issued first memory reference operation to maintain the reduced inter-reference ordering in the system.

3. A method for reducing the latency of inter-reference ordering of memory reference operations issued by a first processor to a multiprocessor system having a shared memory, the first processor sharing a cache with at least a second processor, the method comprising the steps of:

issuing a first memory reference operation for a data item to the system in response to a cache miss access to the shared cache for the data item by the first processor, the first memory reference operation requesting the data item from the system;

generating a commit-signal in control logic of the system in response to the first memory reference operation, the commit-signal indicating apparent completion of the first memory reference operation;

providing the data item to the shared cache from the system in response to the first memory reference operation;

generating a cache hit access on the cache to the data item in response to execution of a second memory reference operation by the second processor; and inheriting, at the second processor, the commit-signal for the first memory reference operation issued by the first processor such that the second processor is inhibited from executing a third memory reference until return of the commit-signal.

4. The method of claim 3 further comprising the step of employing a miss address table (MAT) comprising a plurality of entries, each entry associated with an outstanding memory reference operation to the shared cache, each entry comprising a ComSig flag indicating whether the commit-signal for the outstanding memory reference operation has returned to the MAT.

5. The method of claim 4 wherein the step of employing the MAT comprises the steps of allocating an entry of the MAT in response to the cache miss access.

6. The method of claim 5 wherein the step of employing the MAT further comprises the steps of:

indexing into the MAT to determine if the entry is allocated;

if the entry is allocated, examining the Comsig flag to determine if the commit-signal for the outstanding memory reference operation has returned; and if the commit-signal has not returned, inheriting the commit-signal of the outstanding memory reference operation.

7. The method of claim 6 further comprising the steps of:

providing a first counter for the first processor and a second counter for the second processor;

incrementing the first counter in response to the step of issuing the outstanding memory reference operation for the data item by the first processor;

incrementing the second counter in response to the step of generating a cache hit access for the data item by the second processor;

returning the commit-signal for the outstanding memory reference operation to the MAT; and decrementing the first and second counters in response to the step of returning the commit-signal.

8. Apparatus for reducing the latency of inter-reference ordering of memory reference operations in a multiprocessor system having a shared memory, the system including a first processor sharing a cache with at least a second processor, the first processor issuing a first memory reference operation for a data item to the system in response to a cache miss access to the shared cache for the data item, the apparatus comprising:

an ordering point of the system configured to generate a commit-signal in response to the issued first memory reference operation;

means for providing the data item to the shared cache in response to the issued first memory reference operation; and means for inheriting the commit-signal for the issued first memory reference operation at the second processor in response to a cache hit access to the shared cache for the data item to thereby maintain the reduced inter-reference ordering in the system.

9. The apparatus of claim 8 further comprising a cache controller coupled to the shared cache.

10. The apparatus of claim 9 further comprising a first counter coupled to the cache controller and associated with the first processor.

11. The apparatus of claim 10 further comprising means for incrementing the first counter in response to the issued first memory reference operation.

12. The apparatus of claim 11 further comprising a second counter coupled to the cache controller and associated with the second processor.

13. The apparatus of claim 12 further comprising a miss address table (MAT) coupled to the cache controller, the MAT comprising a plurality of entries, each entry associated with an outstanding memory reference operation to the shared cache.

14. The apparatus of claim 13 wherein each entry of the MAT further comprises a ComSig flag indicating whether a commit-signal for the outstanding memory reference operation has returned to the MAT.

15. The apparatus of claim 14 wherein each entry of the MAT further comprises a ComSig report vector having a plurality of bits, a first report vector bit associated with the first processor sharing the cache and a second report vector bit associated with the second processor sharing the cache.

16. The apparatus of claim 15 wherein the means for inheriting comprises means for incrementing the second counter in response to a cache hit access to the shared cache for the data item by the second processor if the commit-signal has yet to return to the MAT.

17. The apparatus of claim 16 wherein the means for inheriting further comprises means for decrementing the second counter in response to the return of the commit-signal if the second report vector bit is asserted.

* * * * *